United States Patent
Ryu et al.

(10) Patent No.: US 9,418,443 B2
(45) Date of Patent: Aug. 16, 2016

(54) APPARATUS AND METHOD FOR DETECTING OBSTACLE

(71) Applicant: Hyundai Motor Company, Seoul (KR)

(72) Inventors: Seong Sook Ryu, Seoul (KR); Jae Seob Choi, Hwaseong-si (KR); Eu Gene Chang, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 146 days.

(21) Appl. No.: 14/098,422

(22) Filed: Dec. 5, 2013

(65) Prior Publication Data
US 2015/0063630 A1  Mar. 5, 2015

(30) Foreign Application Priority Data
Aug. 27, 2013 (KR) .................. 10-2013-0101733

(51) Int. Cl.
 G06T 7/20 (2006.01)
 G06K 9/00 (2006.01)
 B60R 1/00 (2006.01)

(52) U.S. Cl.
 CPC .............. G06T 7/2053 (2013.01); B60R 1/00 (2013.01); G06K 9/00805 (2013.01); G06T 7/2006 (2013.01); B60R 2300/302 (2013.01); B60R 2300/607 (2013.01); G06T 2207/10004 (2013.01); G06T 2207/20021 (2013.01); G06T 2207/30261 (2013.01)

(58) Field of Classification Search
None
See application file for complete search history.

(56) References Cited

U.S. PATENT DOCUMENTS

| | | | | |
|---|---|---|---|---|
| 7,899,211 | B2 * | 3/2011 | Fujimoto | 382/104 |
| 8,699,754 | B2 * | 4/2014 | Zhang et al. | 382/104 |
| 8,977,007 | B1 * | 3/2015 | Ferguson et al. | 382/104 |
| 2003/0091228 | A1 * | 5/2003 | Nagaoka et al. | 382/154 |
| 2005/0165550 | A1 * | 7/2005 | Okada | 701/301 |
| 2005/0196020 | A1 * | 9/2005 | Comaniciu et al. | 382/104 |
| 2005/0225636 | A1 * | 10/2005 | Maemura et al. | 348/148 |
| 2006/0140447 | A1 * | 6/2006 | Park et al. | 382/104 |
| 2008/0317287 | A1 * | 12/2008 | Haseyama | 382/103 |
| 2010/0060487 | A1 * | 3/2010 | Augst | 340/937 |
| 2010/0097455 | A1 * | 4/2010 | Zhang et al. | 348/119 |
| 2010/0121577 | A1 * | 5/2010 | Zhang et al. | 701/301 |
| 2013/0070095 | A1 * | 3/2013 | Yankun et al. | 348/148 |

(Continued)

FOREIGN PATENT DOCUMENTS

| | | |
|---|---|---|
| JP | 06-176148 A | 6/1994 |
| JP | 10-147199 A | 6/1998 |

(Continued)

*Primary Examiner* — Vu Le
*Assistant Examiner* — Alexander J Lesnick
(74) *Attorney, Agent, or Firm* — McDermott Will & Emery LLP

(57) ABSTRACT

An apparatus and method for detecting an obstacle include a camera to photograph first and second images at different points in time successively. A calculator is configured to calculate a movement distance and a rotation amount of a vehicle by comparing the two images photographed by the camera with each other. A rotation amount compensator is configured to compensate for the rotation amount of the first image based on the second image. A difference value calculator is configured to calculate a difference value between the first image of which the rotation amount is compensated for and the second image based on the calculated movement distance of the vehicle. An obstacle detector extracts a region having the difference value exceeding an expectation value to detect the obstacle.

9 Claims, 11 Drawing Sheets

(56) References Cited

U.S. PATENT DOCUMENTS

2013/0070962 A1* 3/2013 Yankun et al. ............... 382/103
2014/0168440 A1* 6/2014 Tsuchiya et al. ............. 348/148
2014/0313339 A1* 10/2014 Diessner ................. H04N 7/18
348/148

FOREIGN PATENT DOCUMENTS

| JP | 2004237983 A | 8/2004 |
| JP | 2010239190 A | 10/2010 |
| KR | 10-2003-0087960 A | 11/2003 |
| KR | 10-2006-0075311 A | 7/2006 |

* cited by examiner

Vxi=4.6928
(MOVEMENT BY 5PX)

Vxi=8.9629
(MOVEMENT BY 10PX)

Vxi=13.6205
(MOVEMENT BY 15PX)

Vxi=18.0932
(MOVEMENT BY 20PX)

Vxi=22.8412
(MOVEMENT BY 25PX)

Vxi=20.8990
(MOVEMENT BY 30PX)

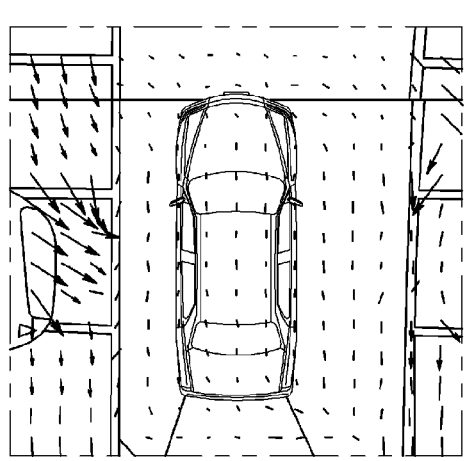 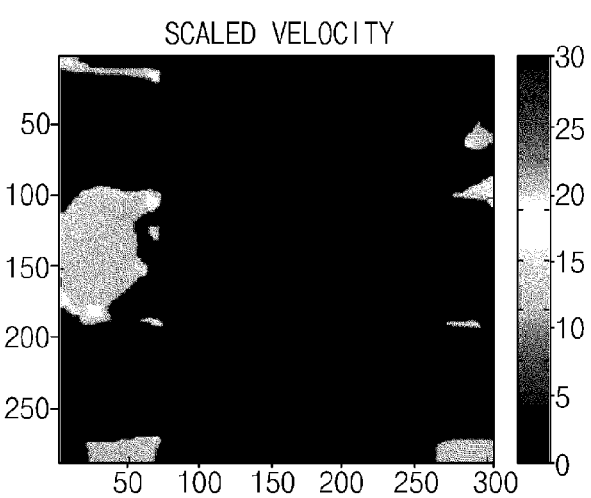
Fig.9A                    Fig.9B

APPARATUS AND METHOD FOR DETECTING OBSTACLE

CROSS-REFERENCE TO RELATED APPLICATION

This application claims the benefit of priority to Korean Patent Application No. 10-2013-0101733, filed on Aug. 27, 2013 in the Korean Intellectual Property Office, the disclosure of which is incorporated herein in its entirety by reference.

TECHNICAL FIELD

The present disclosure relates to an apparatus and method for detecting an obstacle, and more particularly, to a technology of detecting an obstacle using a difference value between two images.

BACKGROUND

Generally, in a technology of detecting an obstacle of a vehicle, an ultrasonic sensor provided in the vehicle is used. However, the ultrasonic sensor may erroneously sense the obstacle depending on a position at which it is mounted and the surrounding environment. In addition, in the case of detecting the obstacle using the ultrasonic sensor, a place at which the obstacle is not present is sensed by error due to a prominence or depression of the ground or disturbance of a sound source, such that an erroneous alarm may be issued. Therefore, reliability for detecting the obstacle is decreased.

Further, in the case of detecting the obstacle using the ultrasonic sensor, the obstacle may be detected only in a direction in which the ultrasonic sensor is mounted. That is, in order to detect the obstacle in all directions of the vehicle, ultrasonic sensors need to be mounted in all directions of the vehicle.

SUMMARY

The present disclosure has been made to solve the above-mentioned problems occurring in the prior art while advantages achieved by the prior art are maintained intact.

An aspect of the present disclosure provides an apparatus and method for detecting an obstacle capable of detecting the obstacle around a vehicle by identifying a bottom surface using a difference value depending on vehicle movement between top-view images photographed at different points in time.

According to an exemplary embodiment of the present disclosure, an apparatus for detecting an obstacle includes a camera configured to photograph first and second images at different points in time among successively photographed images. A calculator is configured to calculate a movement distance and a rotation amount of a vehicle by comparing the two images photographed by the camera with each other. A rotation amount compensator compensates for a rotation amount of the first image based on the second image. A difference value calculator is configured to calculate a difference value between the first image of which the rotation amount is compensated for and the second image based on the calculated movement distance of the vehicle. An obstacle detector extracts a region having a difference value exceeding an expectation value to detect the obstacle.

The difference value calculator may move a reference image in a specific pixel unit and determine a relationship equation of the difference value depending on a pixel movement amount based on an average value in each block in each moved pixel unit.

The difference value calculator may convert the movement distance of the vehicle depending on controller area network (CAN) information into a pixel value in the image to calculate the pixel movement amount and apply the calculated pixel movement amount to the determined relationship equation to calculate the expectation value for the difference value.

The apparatus for detecting an obstacle may further include a mapper to map the difference value calculated from the first image and the second image and a magnitude of a speed field between the first image and the second image to each other.

The obstacle detector may identify a region having the same speed and the difference value corresponding to the movement of the vehicle from the difference value and the magnitude of the speed field mapped to each other as a bottom surface.

The calculator may convert the pixel value in the image from a region in which the vehicle is positioned up to a region in which a magnitude of a speed field exceeds the expectation value into a unit distance to calculate a distance up to the obstacle.

The calculator may calculate the movement distance and the rotation amount of the vehicle between the two images using the controller area network (CAN) information of the vehicle, wherein the CAN information includes at least one of a radius of a vehicle wheel, a circumference of the wheel, the number of sawteeth of a rear wheel, a pulse value of the wheel depending on a difference between the two images and a steering value.

The first and second images may be a top-view image.

According to another exemplary embodiment of the present disclosure, a method for detecting an obstacle includes obtaining first and second images at different points in time. A movement distance and a rotation amount of a vehicle are calculated by comparing the first and second images with each other. The rotation amount of the first image is compensated for based on the second image. A difference value is calculated between the first image of which the rotation amount is compensated for and the second image based on the calculated movement distance of the vehicle. The difference value calculated from the first image and the second image and a magnitude of a speed field between the first image and the second image are mapped to each other. The obstacle from a region having a difference value exceeding an expectation value is detected based on the difference value and the magnitude of the speed field.

BRIEF DESCRIPTION OF THE DRAWINGS

The above and other objects, features, and advantages of the present disclosure will be more apparent from the following detailed description taken in conjunction with the accompanying drawings.

FIGS. 2 to 10B are illustrative diagrams for describing an operation of the apparatus for detecting an obstacle according to an exemplary embodiment of the present disclosure.

DETAILED DESCRIPTION

Hereinafter, exemplary embodiments of the present disclosure will be described with reference to the accompanying drawings.

Figure 1:
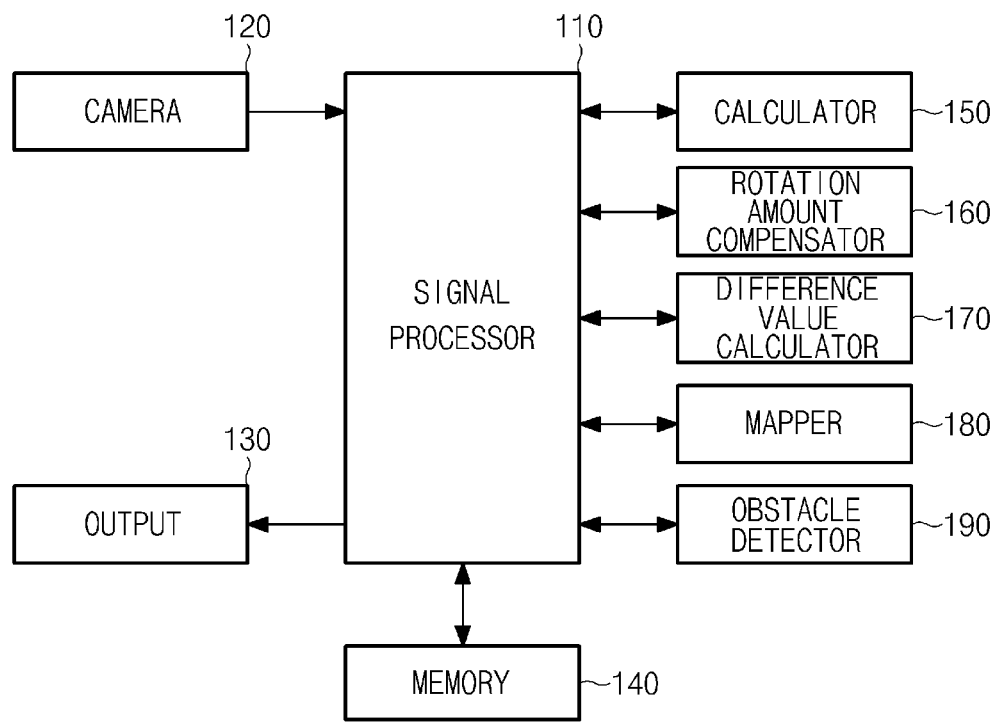
FIG. 1 is a block diagram showing a configuration of an apparatus for detecting an obstacle according to an exemplary embodiment of the present disclosure.

FIG. 1 is a block diagram showing a configuration of an apparatus for detecting an obstacle according to an exemplary embodiment of the present disclosure. Referring to FIG. 1, the apparatus for detecting an obstacle according to an exemplary embodiment of the present includes a signal processor 110, a camera 120, an output 130, a memory 140, a calculator 150, a rotation amount compensator 160, a difference value calculator 170, a mapper 180, and an obstacle detector 190. Here, the signal processor 110 controls a signal flow between the respective units of the apparatus for detecting an obstacle.

The camera 120, which photographs images around the vehicle, may be disposed at the front, the rear, the left, and the right of the vehicle. The camera 120 can successively photograph first and second images around the vehicle at different points in time. Here, it is assumed that the first image is an image photographed before the second image is photographed, and the second image is an image photographed after the first image is photographed. The first and second images correspond to a top-view image in which the front, rear, left, right images of the vehicle are synthesized with each other. The first and second images may be formed by synthesizing the front, rear, left, right images of the vehicle photographed by the camera 120 with each other and view-converting the synthesized images. A vehicle having an around-view monitoring (AVM) system may also provide the top-view image.

The output 130, which outputs an operation state and an obstacle detection result of the apparatus for detecting an obstacle in the vehicle, may be a monitor, a navigation screen, or a speaker and a buzzer.

The memory 140 may store an operation value of the apparatus for detecting an obstacle and store the images obtained from the camera 120.

Figure 2:
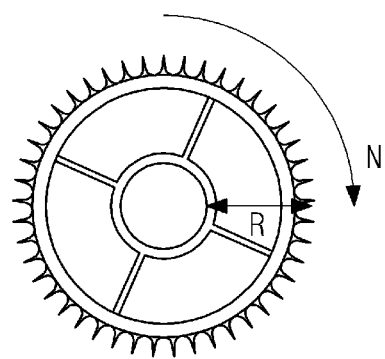

The calculator 150 calculates a movement distance and a rotation amount of the vehicle depending on a difference between the first and second images by comparing the first and second images with each other. Here, the calculator 150 may calculate the movement distance and the rotation amount of the vehicle between two images using controller area network (CAN) information of the vehicle. In other words, the calculator 150 may calculate the movement distance L of the vehicle using a radius R of a wheel of the vehicle, a circumference 2ΠR of the wheel, the number N of sawteeth of a rear wheel, and a pulse value P of the wheel depending on the movement of the vehicle between two images, as shown in FIG. 2.

When the movement distance L of the vehicle between the two images is calculated using the CAN information, it may be calculated by the following [Equation 1].

$$L = P * 2\Pi R / N \quad \text{[Equation 1]}$$

The calculator 150 may calculate the rotation amount of the vehicle using a steering value depending on the movement of the vehicle between the two images.

In addition, the calculator 150 may calculate the distance from the vehicle to the obstacle detected in the image. In this case, the calculator 150 converts a pixel value in the image from a region in which the vehicle is positioned up to a region in which the obstacle is detected into a unit distance of each pixel, thereby making it possible to calculate the distance to the obstacle.

The rotation amount compensator 160 compensates for a rotation amount of the obtained image using the rotation amount of the vehicle calculated by the calculator 150. In this case, the rotation amount compensator 160 compensates for a rotation amount of the first image based on the second image. An example thereof will be described in more detail with reference to FIGS. 3A to 4B.

The difference value calculator 170 moves a reference image of the top-view image obtained from the camera 120 in a specific pixel unit and determines a relationship equation of the difference value depending on a pixel movement amount based on an average value in each block in each moved pixel unit. An example thereof will be described in more detail with reference to FIGS. 5A to 6.

Here, the difference value calculator 170 converts the movement distance of the vehicle between the first and second images into the pixel value in the image to calculate the pixel movement amount and applies the calculated pixel movement amount to the relationship equation as described above to calculate an expectation value for the difference value.

In addition, the difference value calculator 170 calculates the difference value between the first image of which the rotation amount is compensated for by the rotation amount compensator 160 and the second image, based on the movement distance of the vehicle between the first and second images calculated by the calculator 150. The difference value between the first image of which the rotation amount is compensated for and the second image may be a magnitude of an optical flow, but is not limited thereto. However, in the following exemplary embodiment, a description will be provided on the assumption that the difference value between the first image of which the rotation amount is compensated for, and the second image is the magnitude of the optical flow.

The mapper 180 maps the difference value calculated from the first and second images and a magnitude of a speed field between the first and second images to each other. In this case, the obstacle detector 190 may detect an obstacle region from an image in which the calculated difference value and the magnitude of the speed field are mapped to each other.

In other words, the obstacle detector 190 identifies a region having the same speed and the difference value corresponding to the movement of the vehicle from the difference value and the magnitude of the speed field mapped to each other as a bottom surface. In addition, the obstacle detector 190 extracts a region in which the difference value calculated between the first and second images exceeds an expectation value and recognizes the extracted region in which the obstacle is present. Further, the obstacle detector 190 recognizes a region in which the magnitude of the speed field exceeds a reference value as a region in which the obstacle is present.

Therefore, the obstacle detector 190 detects the region in which the obstacle is present as the obstacle, and the output 130 outputs an obstacle detecting result. In this case, the calculator 150 may convert the pixel value in the image from the region in which the vehicle is positioned up to the region where the magnitude of the speed field exceeds the reference value into a unit distance to calculate a distance to the obstacle. In this case, the output 130 outputs information on the calculated distance to the obstacle.

FIGS. 2 to 10B are illustrative diagrams for describing an operation of the apparatus for detecting an obstacle according to an exemplary embodiment of the present disclosure.

As FIG. 2 shows an example of a rear wheel, when it is assumed that a radius R of a wheel of the vehicle is 0.33436 m, and the number N of sawteeth of a rear wheel is 47, L=0.045P by the above Equation 1. When the pulse value P of the wheel depending on the movement of the vehicle between the two images obtained from the CAN information is substituted into the above Equation 1, L may be easily calculated.

Figure 3A:
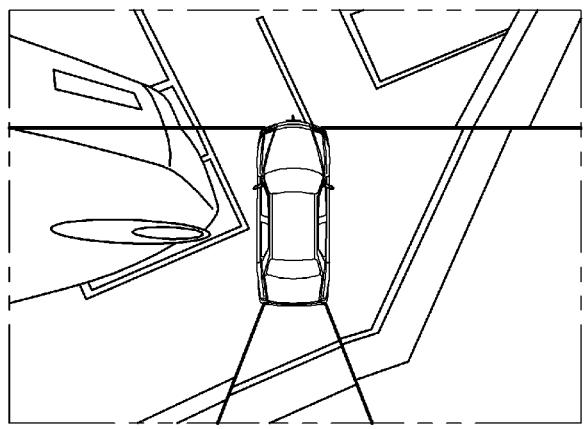
Figure 3B:
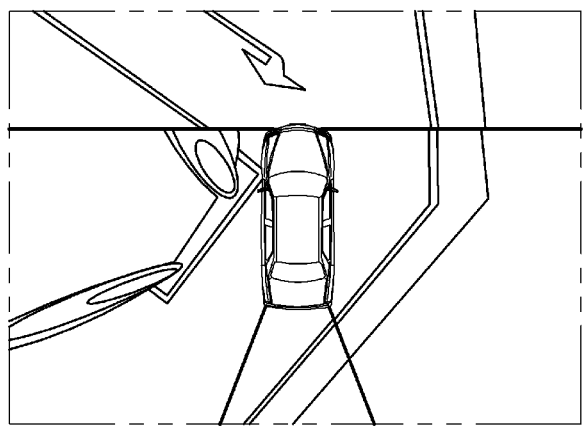
Figure 4A:
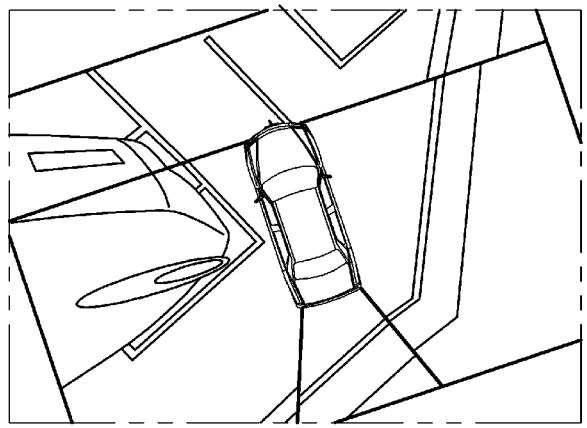

FIG. 3A shows an original image of the first image, and FIG. 3B shows an original image of the second image. FIG. 4A shows the first image of which a rotation amount is compensated for, and FIG. 4B shows an original image of the second image.

As shown in FIGS. 3A and 3B, in the case in which the vehicle is rotated, a difference is generated in all of the remaining regions except for the vehicle in the first and second images, which has an effect on the difference value. Therefore, as shown in FIGS. 3A and 3B, when the difference value depending on the movement of the vehicle between the two images is calculated without compensating for the rotation amount of the first image, a larger error may be generated as compared with an actual movement amount of the vehicle.

Figure 4B:
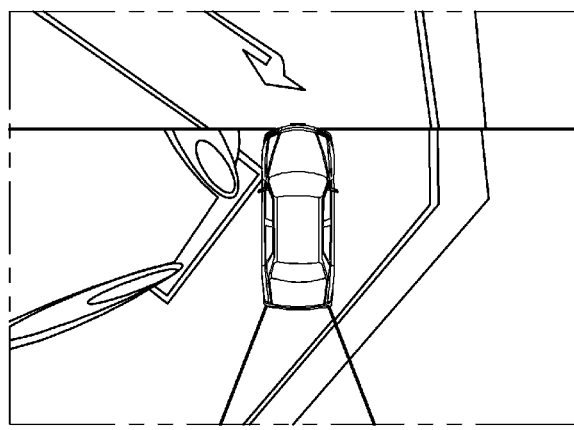

On the other hand, as shown in FIGS. 4A and 4B, when the vehicle is rotated, and the rotation amount of the first image is compensated for based on a neighboring region of the second image, since positions of a fixed obstacle or a bottom surface around the vehicle between the two images coincide with each other, the difference value depending on the movement of the vehicle may be more accurately calculated as compared with FIGS. 3A and 3B.

Figure 5A:
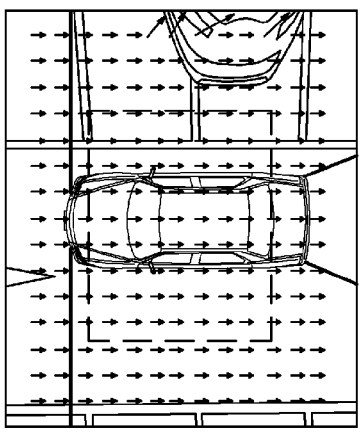
Figure 5B:
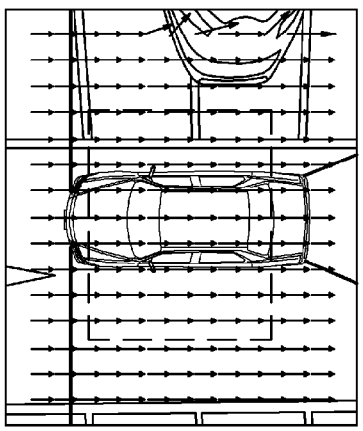
Figure 5C:
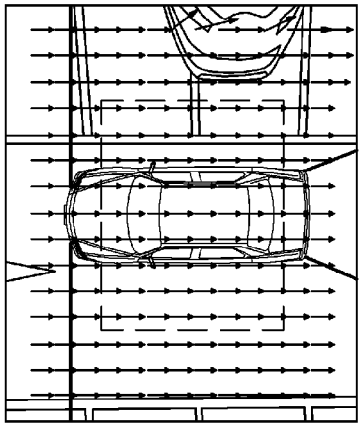
Figure 5D:
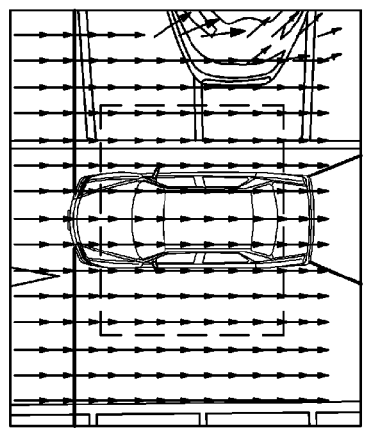
Figure 5E:
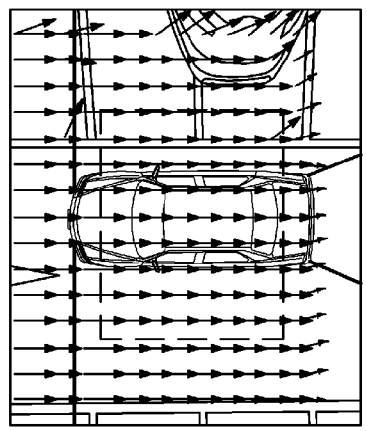
Figure 5F:
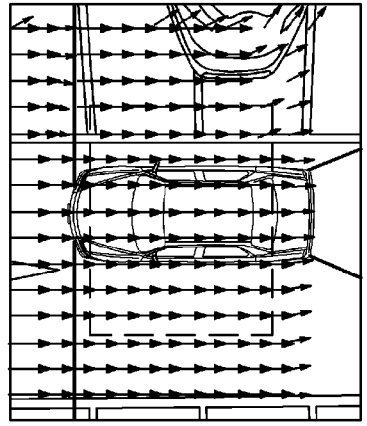
Figure 6:
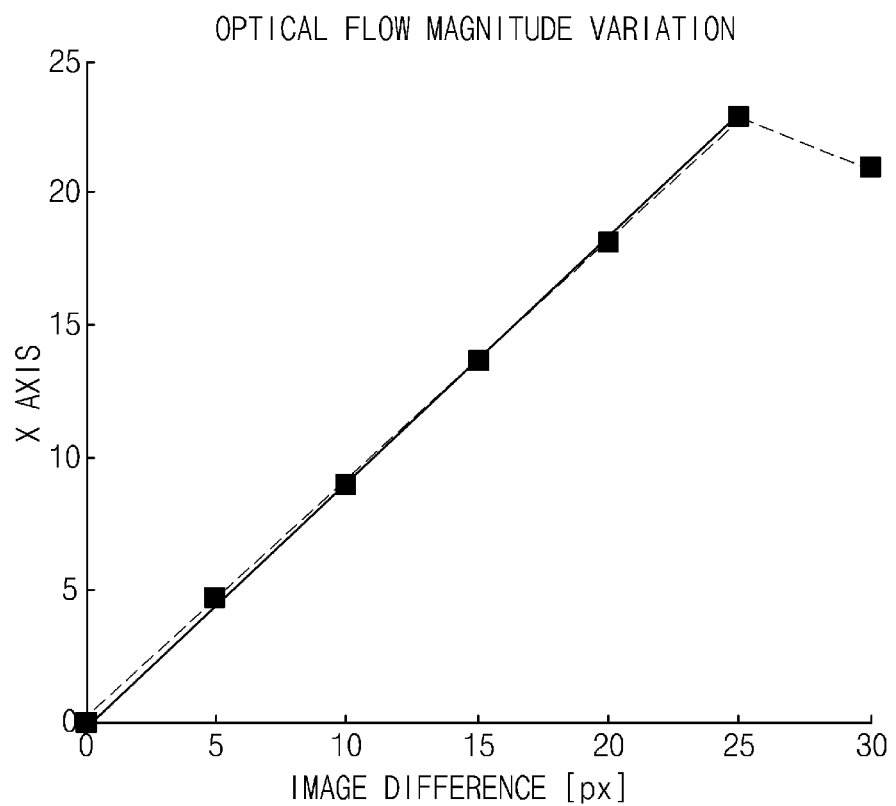
Figure 7A:
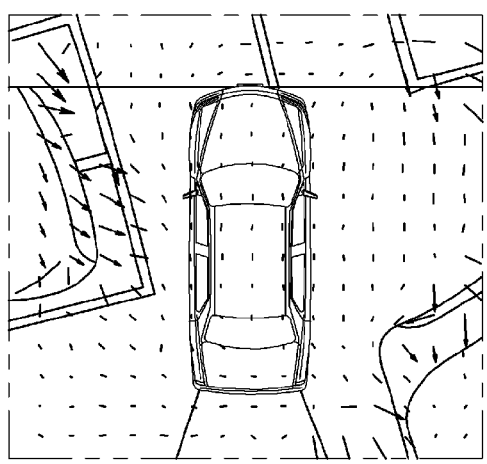
Figure 7B:
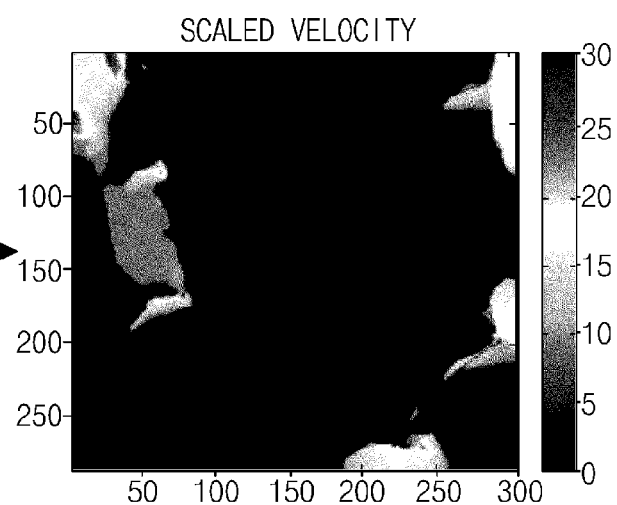
Figure 8A:
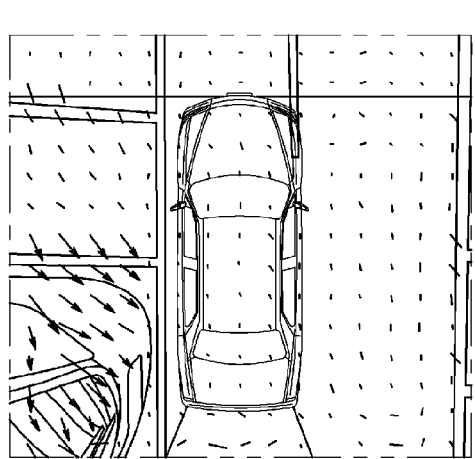
Figure 8B:
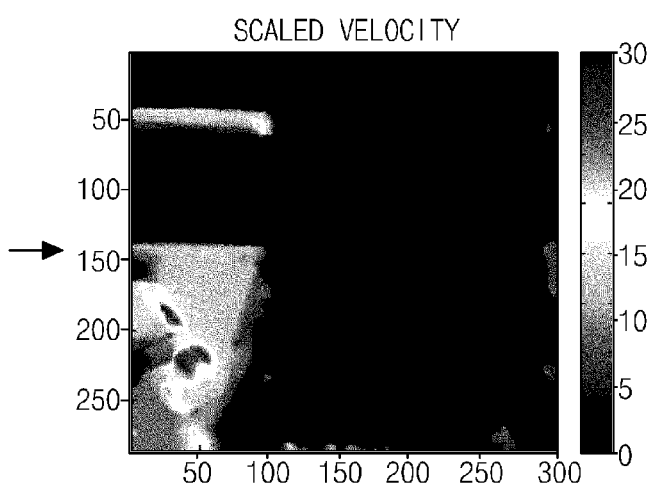
Figure 10A:
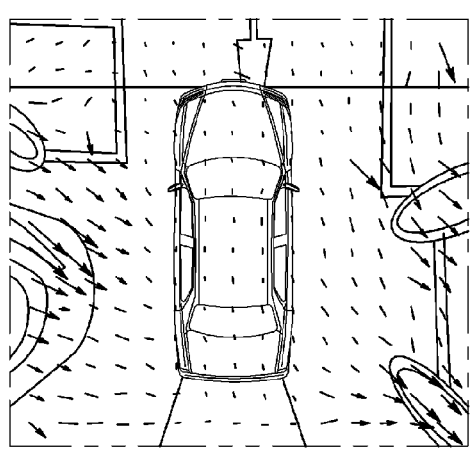
Figure 10B:
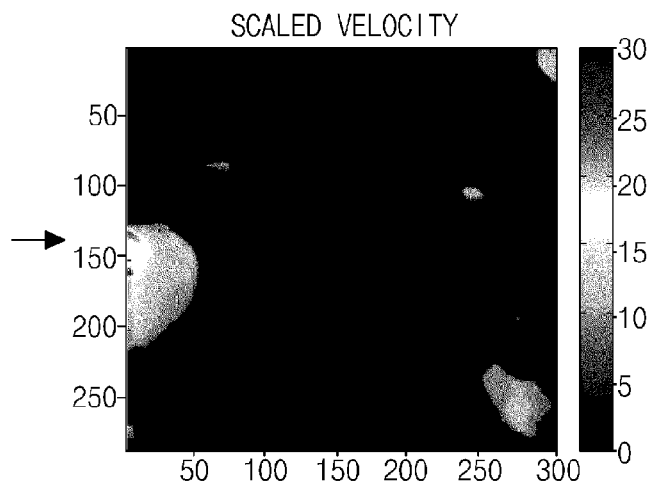

FIGS. 5A to 5F show difference values depending on a pixel movement amount, and FIG. 6 shows a relationship graph of the difference value depending on the pixel movement amount from FIG. 5.

The apparatus for detecting an obstacle according to an exemplary embodiment of the present disclosure moves the reference image in the specific pixel unit and calculates the difference value depending on the pixel movement amount based on an average value in each block in each moved pixel unit. FIGS. 5A to 5F show an image obtained by moving the reference image in a 5 px unit.

FIG. 5A shows an image obtained by moving the reference image by 5 px, where a difference value Vxi is 4.6928. FIG. 5B shows an image obtained by moving the reference image by 10 px, where a difference value Vxi is 8.9629. FIG. 5C shows an image obtained by moving the reference image by 15 px, where a difference value Vxi becomes 13.6205. FIG. 5D shows an image obtained by moving the reference image by 20 px, where a difference value Vxi is 18.0932. FIG. 5E shows an image obtained by moving the reference image by 25 px, where a difference value Vxi becomes 22.8412. FIG. 5F shows an image obtained by moving the reference image by 30 px, where a difference value Vxi becomes 20.8990.

The pixel movement amounts and the difference values in FIGS. 5A to 5F may be represented by a graph of FIG. 6. As shown in FIG. 6, the pixel movement amounts and the difference values are represented by a linear graph, through which a relationship equation between the pixel movement amount and the difference value may be determined. Therefore, the apparatus for detecting an obstacle may convert the movement distance of the vehicle depending on the CAN information into the pixel value in the image to calculate the pixel movement amount and apply the calculated pixel movement amount to the determined relationship equation to calculate an expectation value for the difference value.

FIGS. 7A to 10B show difference values and speed fields depending on vehicle movement between two images obtained around the vehicle.

Referring to FIGS. 7A, 8A, 9A, and 10A showing the difference values depending on the vehicle movement between the two images, a difference value where the obstacle is positioned may be larger than a difference value where the obstacle is not present.

Referring to FIGS. 7B, 8B, 9B, and 10B showing the magnitude of the speed fields depending on the vehicle movement between the two images, a magnitude of a speed field where the obstacle is positioned may be larger than that of a speed field where the obstacle is not present, similar to the difference value.

An operation flow of the apparatus for detecting an obstacle according to an exemplary embodiment of the present disclosure configured as described above will be described below in more detail.

Figure 11:
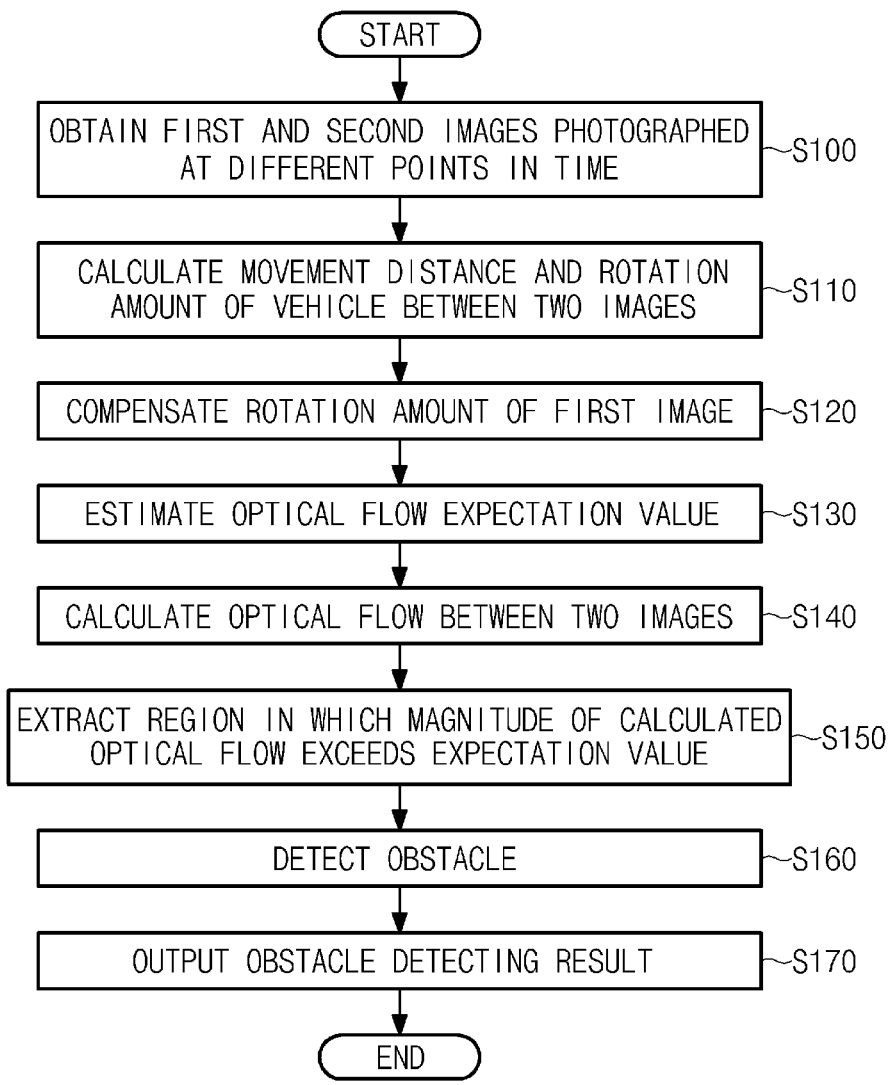
FIG. 11 is a flow chart showing an operation flow of a method for detecting an obstacle according to an exemplary embodiment of the present disclosure.

FIG. 11 is a flow chart showing an operation flow of a method for detecting an obstacle according to an exemplary embodiment of the present disclosure. As shown in FIG. 11, the apparatus for detecting an obstacle according to an exemplary embodiment of the present disclosure obtains the first and second images at different points in time (S100), calculates the movement distance and the rotation amount of the vehicle between the two images obtained in S100 (S110), and compensates for the rotation amount of the first image based on the second image depending on the rotation amount calculated in S110 (S120).

The apparatus for detecting an obstacle according to an exemplary embodiment of the present disclosure calculates an expectation value of the difference value depending on the movement distance of the vehicle in the corresponding image using a relationship equation depending on the pixel movement amount and the difference value (S130) and calculates the difference value depending on the difference between the two images obtained in S100 (S140).

Then, the apparatus for detecting an obstacle according to an exemplary embodiment of the present disclosure compares the difference value calculated in S140 and the expectation value calculated in S130 with each other, extracts a region in which the calculated difference value exceeds the expectation value (S150), and detects the obstacle from the region extracted in S150 (S160). The apparatus for detecting an obstacle according to an exemplary embodiment of the present disclosure outputs the obstacle detecting result in S160 through an output 130 so as to be configured by a user (S170).

According to an exemplary embodiment of the present disclosure, the bottom surface and the obstacle around the vehicle are detected using the difference value depending on the movement of the vehicle between the top-view images photographed at different points in time, thereby minimizing an error in detecting the bottom surface and the obstacle due to erroneous sensing of the sensor and detecting the obstacle in all directions of the vehicle.

Although the apparatus and the method for detecting an obstacle according to the exemplary embodiment of the present disclosure have been described with reference to the accompanying drawings, the present disclosure is not limited to the exemplary embodiment and the accompanying drawings disclosed in the present specification, but may be modified without departing from the scope and spirit of the present disclosure.

What is claimed is:

1. An apparatus for detecting an obstacle, comprising:
   a camera to photograph first and second images at different points in time successively;
   a calculator configured to calculate a movement distance and a rotation amount of a vehicle between the two images photographed by the camera with each other using controller area network (CAN) information of the vehicle;

a rotation amount compensator to compensate for a rotation amount of the first image based on the second image, wherein the rotation amount compensator rotates the first image using the rotation amount of the vehicle calculated by the calculator based on a surrounding region of the second image such that a position of an obstacle around the vehicle in the second image coincides with a position of the obstacle in the first image of which the rotation amount is compensated for;

a difference value calculator configured to calculate a difference value between the first image of which the rotation amount is compensated for and the second image based on the calculated movement distance of the vehicle, wherein the difference value calculator converts the movement distance of the vehicle calculated by the calculator into a pixel value in the image to calculate a pixel movement amount; and an obstacle detector to extract a region having the difference value exceeding an expectation value between the first image of which the rotation amount is compensated for and the second image to detect the obstacle, wherein the obstacle detector is able to distinguish between the obstacle and a bottom surface by the pixel movement amount, wherein the calculator converts the pixel value in the image from the region in which the vehicles is positioned up to the region extracted by the obstacle detector into a unit distance to calculate a distance to the obstacle.

2. The apparatus for detecting an obstacle according to claim 1, wherein the difference value calculator moves a reference image in a specific pixel unit and determines a relationship equation of the difference value depending on a pixel movement amount based on an average value in each block in each moved pixel unit.

3. The apparatus for detecting an obstacle according to claim 2, wherein the difference value calculator applies the calculated pixel movement amount to the determined relationship equation to calculate the expectation value for the difference value.

4. The apparatus for detecting an obstacle according to claim 1, further comprising a mapper configured to map the difference value calculated from the first image of which the rotation amount is compensated for and the second image and a magnitude of an optical flow between the first image of which the rotation amount is compensated for and the second image to each other.

5. The apparatus for detecting an obstacle according to claim 4, wherein the obstacle detector identifies a region having the same speed and the difference value corresponding to the movement of the vehicle from the difference value and the magnitude of the optical flow mapped to each other as a bottom surface.

6. The apparatus for detecting an obstacle according to claim 3, wherein the calculator converts the pixel value in the image from a region in which the vehicle is positioned up to a region in which a magnitude of an optical flow exceeds the expectation value into a unit distance to calculate a distance up to the obstacle.

7. The apparatus for detecting an obstacle according to claim 1, wherein the CAN information including at least one of a radius of a vehicle wheel, a circumference of the wheel, a number of sawteeth of a rear wheel, a pulse value of the wheel depending on the vehicle movement between the two images, and a steering value.

8. The apparatus for detecting an obstacle according to claim 1, wherein the first and second images are top-view images.

9. A method for detecting an obstacle, comprising:

obtaining first and second images at different points in time;

calculating a movement distance and a rotation amount of a vehicle between the first and second images with each other using controller area network (CAN) information of the vehicle;

compensating for the rotation amount of the first image based on the second image, wherein a rotation amount compensator rotates the first image using the rotation amount of the vehicle calculated by the calculator based on a surrounding region of the second image such that a position of an obstacle around the vehicle in the second image coincides with a position of the obstacle in the first image of which the rotation amount is compensated for;

calculating a difference value between the first image of which the rotation amount is compensated for and the second image based on the calculated movement distance of the vehicle, wherein a difference value calculator converts the movement distance of the vehicle calculated by the calculator into a pixel value in the image to calculate a pixel movement amount; and mapping the difference value calculated from the first image of which the rotation amount is compensated for and the second image and a magnitude of an optical flow between the first image of which the rotation amount is compensated for and the second image to each other; and detecting the obstacle from a region having the difference value exceeding an expectation value based on the difference value and the magnitude of the optical flow, wherein an obstacle detector is able to distinguish between the obstacle and a bottom surface by the pixel movement amount, wherein the calculator converts the pixel value in the image from a region in which the vehicles is positioned up to the region extracted by the obstacle detector into a unit distance to calculate a distance to the obstacle.

* * * * *